D. B. HELVERING.
Shaft-Support for Vehicles.

No. 221,677.  Patented Nov. 18, 1879.

Witnesses:
D. E. South
G. H. Clare

Inventor:
Daniel B. Helvering
By Townsley and South,
Atty's.

UNITED STATES PATENT OFFICE.

DANIEL B. HELVERING, OF FELICITY, OHIO, ASSIGNOR OF ONE-HALF OF HIS RIGHT TO HENRY F. STRUEVE, OF SAME PLACE.

IMPROVEMENT IN SHAFT-SUPPORTS FOR VEHICLES.

Specification forming part of Letters Patent No. 221,677, dated November 18, 1879; application filed August 30, 1879.

*To all whom it may concern:*

Be it known that I, DANIEL B. HELVERING, of Felicity, in the county of Clermont and State of Ohio, have invented certain new and useful Improvements in Shaft-Supports for Vehicles; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention has for its object to hold the shafts of a vehicle in an elevated position when the vehicle is not in use, in order to economize space.

The nature of the invention consists in the construction and novel arrangement of parts, as hereinafter shown and described.

Figure 1:
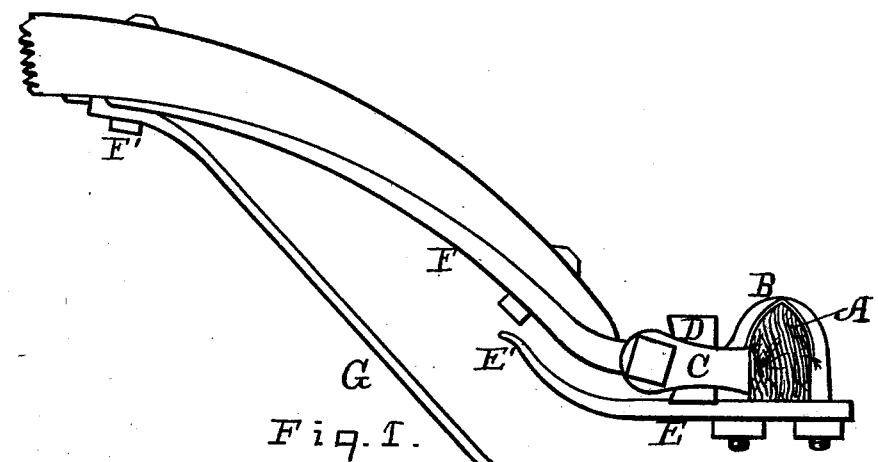
Figure 2:
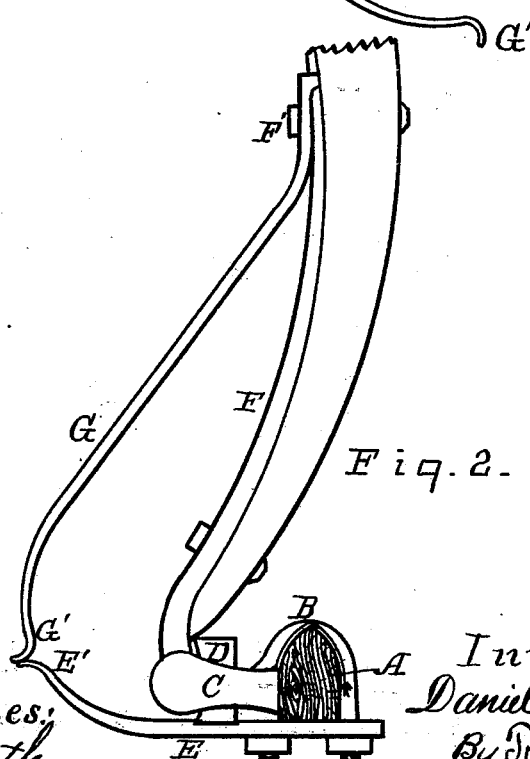

Figures 1 and 2 are both side views of my invention.

Referring to the drawings, Fig. 1 is a side view of my invention as it appears when the horse is fastened to the vehicle. A is the axle. B is the axle-clip. C is the axle-clip jaws. D is the rubber or anti-rattler. E is the axle-yoke, bolted to the under side of the clip B, in the usual way. E' is the end of the axle-yoke E, extended and curved, forming the support at E'. F is the shaft-iron, and G is the steel spring-bar bolted to the under side of the shaft-iron at F', while G', at the lower or loose end of the steel spring-bar G, is the rest.

Fig. 2 is the same as Fig. 1, except that the shafts in this figure are elevated ready to put the horse in place for hitching, &c., which shows the rest E' and the lower end of the steel spring-bar G' as they appear in combination, forming a complete support for the shafts of a vehicle.

My invention is intended to do away with the usual way of supporting the shafts of vehicles by placing a stick under the shafts and over the front axle and into one side of the fifth-wheel, and also as a great improvement over some of the more cumbersome inventions of a similar character—that is to say, inventions used for the same purpose.

By simply taking hold of one end of either of the shafts and raising it upward, the steel spring-bar G, at its lower end G', will pass by the curved end of the axle-yoke E at E', and will spring into its place upon the top or rest, as shown at E' and G' in Fig. 2.

I do not claim as new the axle-yoke E nor the steel spring-bar G; but I disclaim both of them.

Having thus described my invention, what I do claim as new, and desire to secure by Letters Patent, is—

A shaft-support for vehicles, consisting of the axle-yoke E, attached to clip B, having the curved end support E', the spring G, secured to the shaft-iron F, provided with curved rest G', adapted to engage the support E', and hold the shaft in position when elevated, substantially as specified.

In testimony that I claim the foregoing as my own I affix my signature in presence of two witnesses.

DANIEL B. HELVERING.

Witnesses:
W. W. WATEFIELD,
F. S. KENNEDY.